May 14, 1935.  A. W. CAPS ET AL  2,001,597

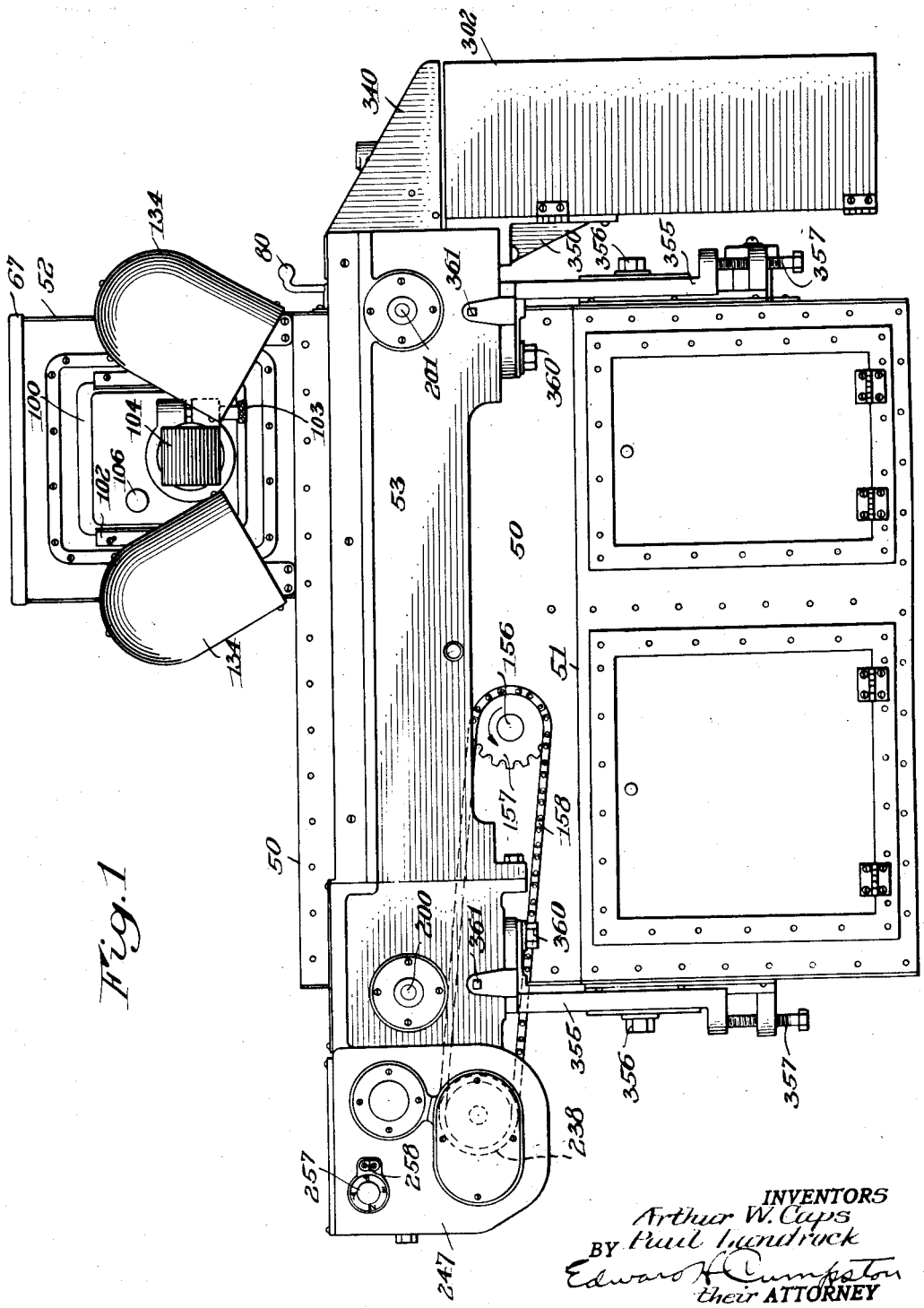

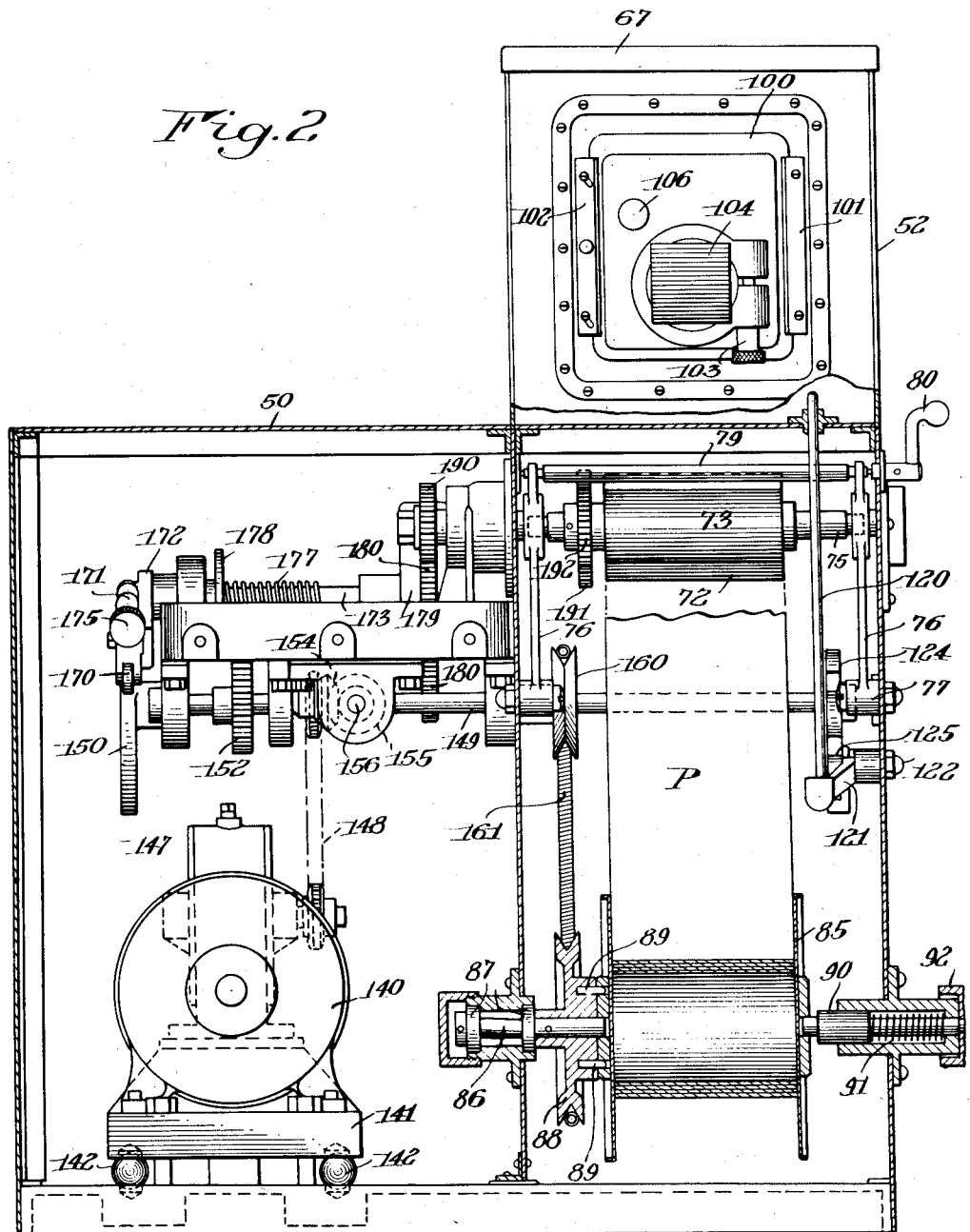

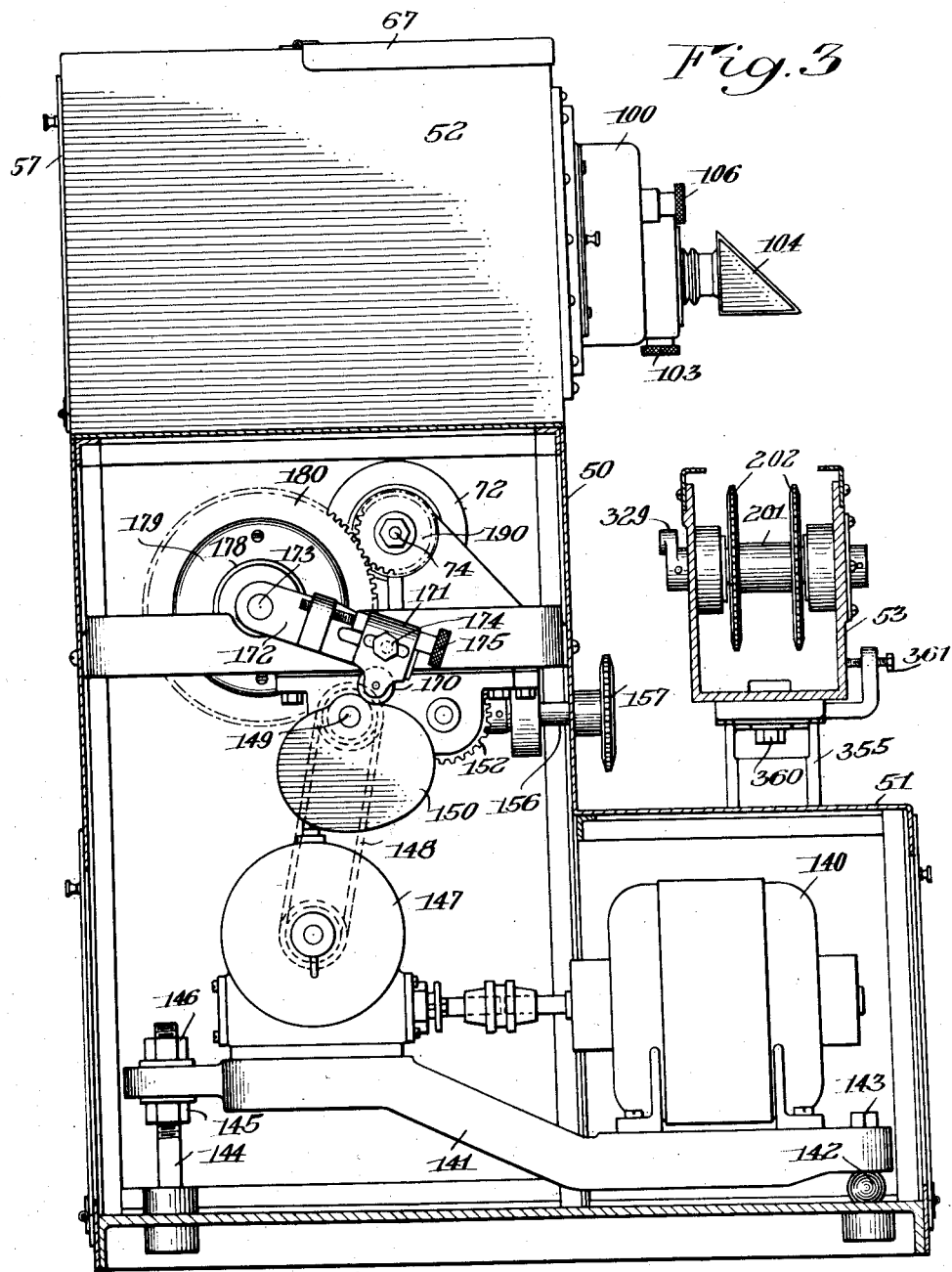

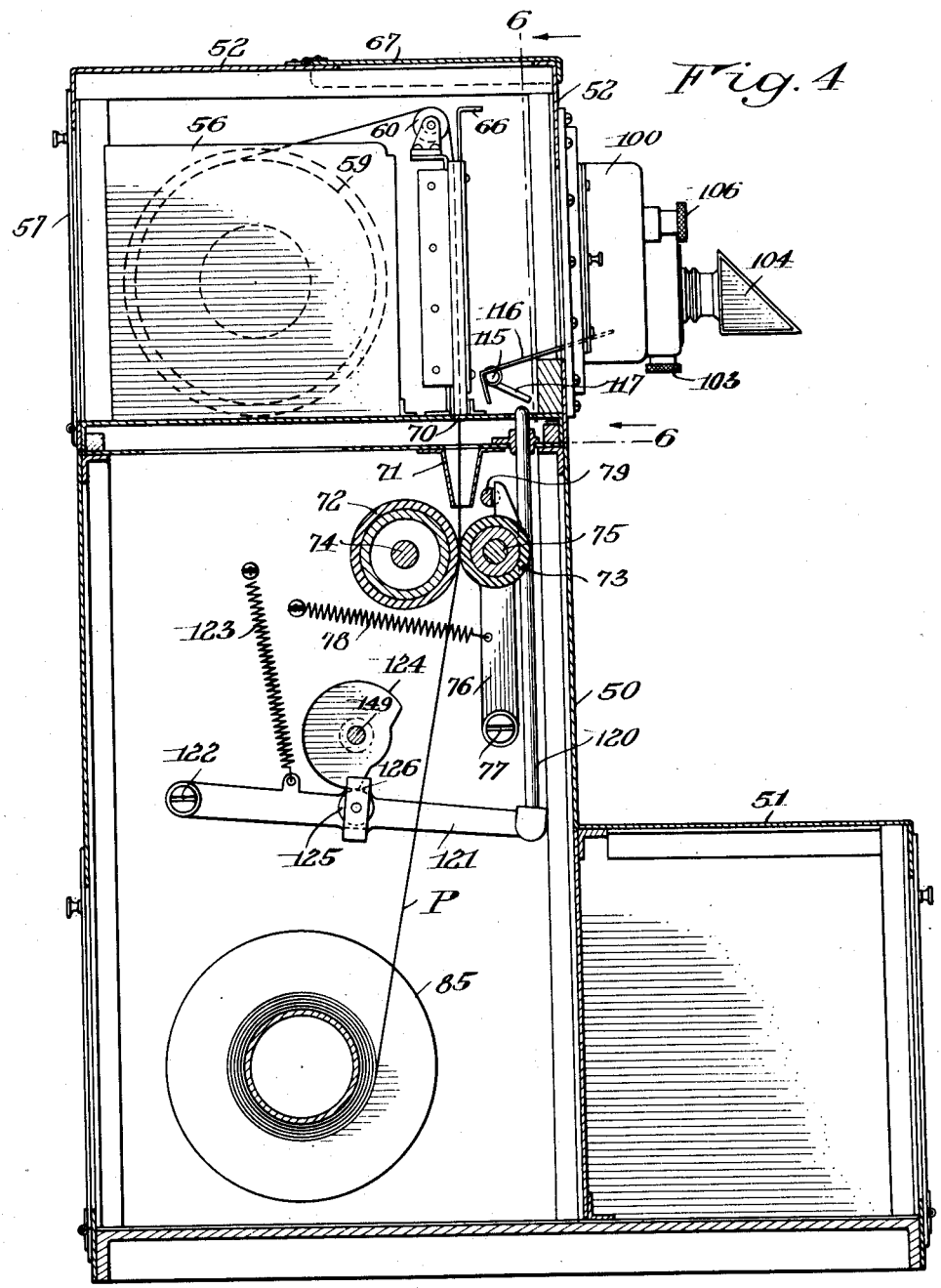

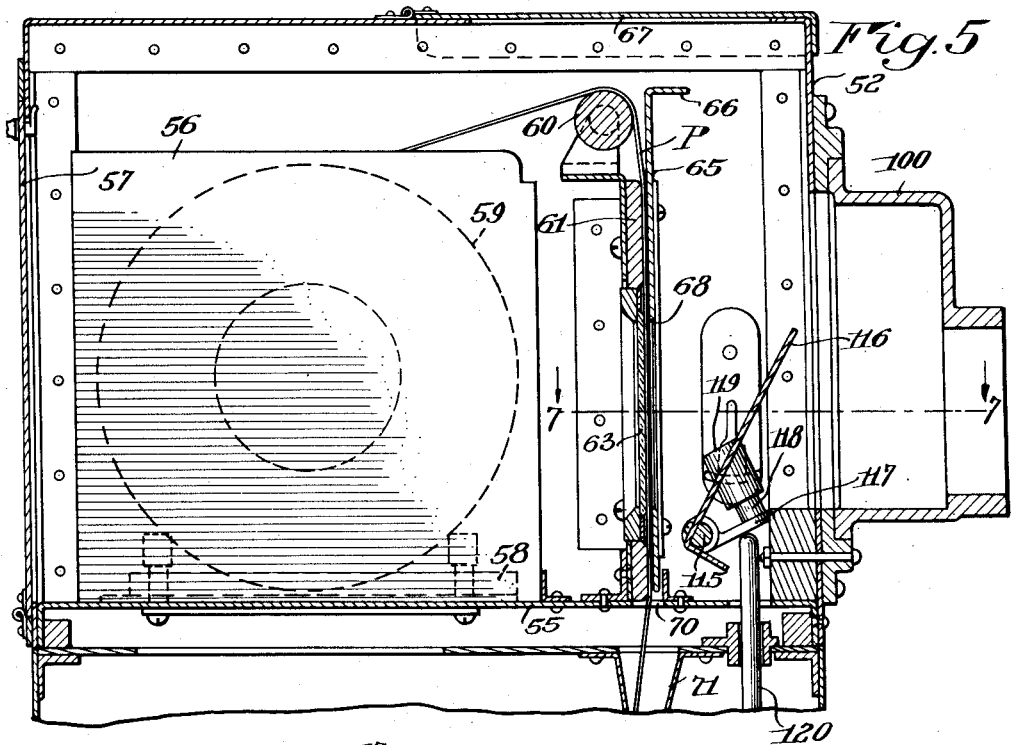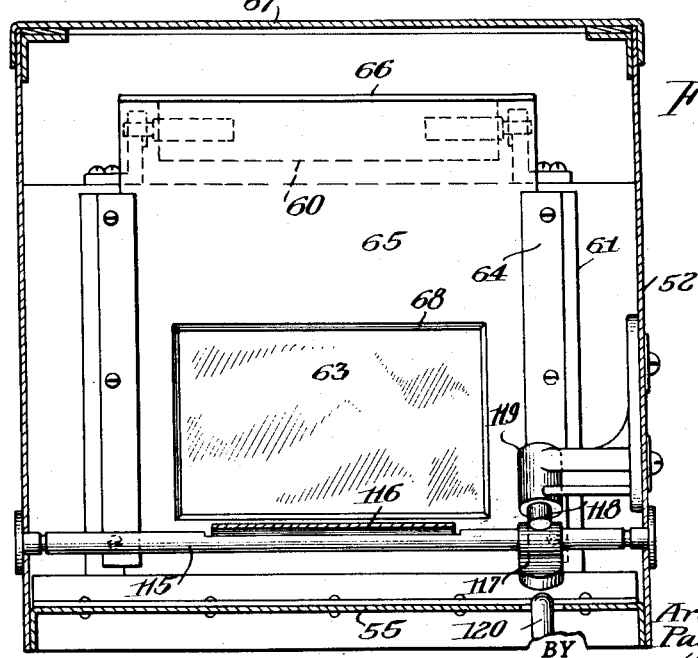

CAMERA

Original Filed Dec. 21, 1931  8 Sheets-Sheet 6

INVENTORS
Arthur W. Caps
Paul Landrock
Edward Cumpston
BY
their ATTORNEY

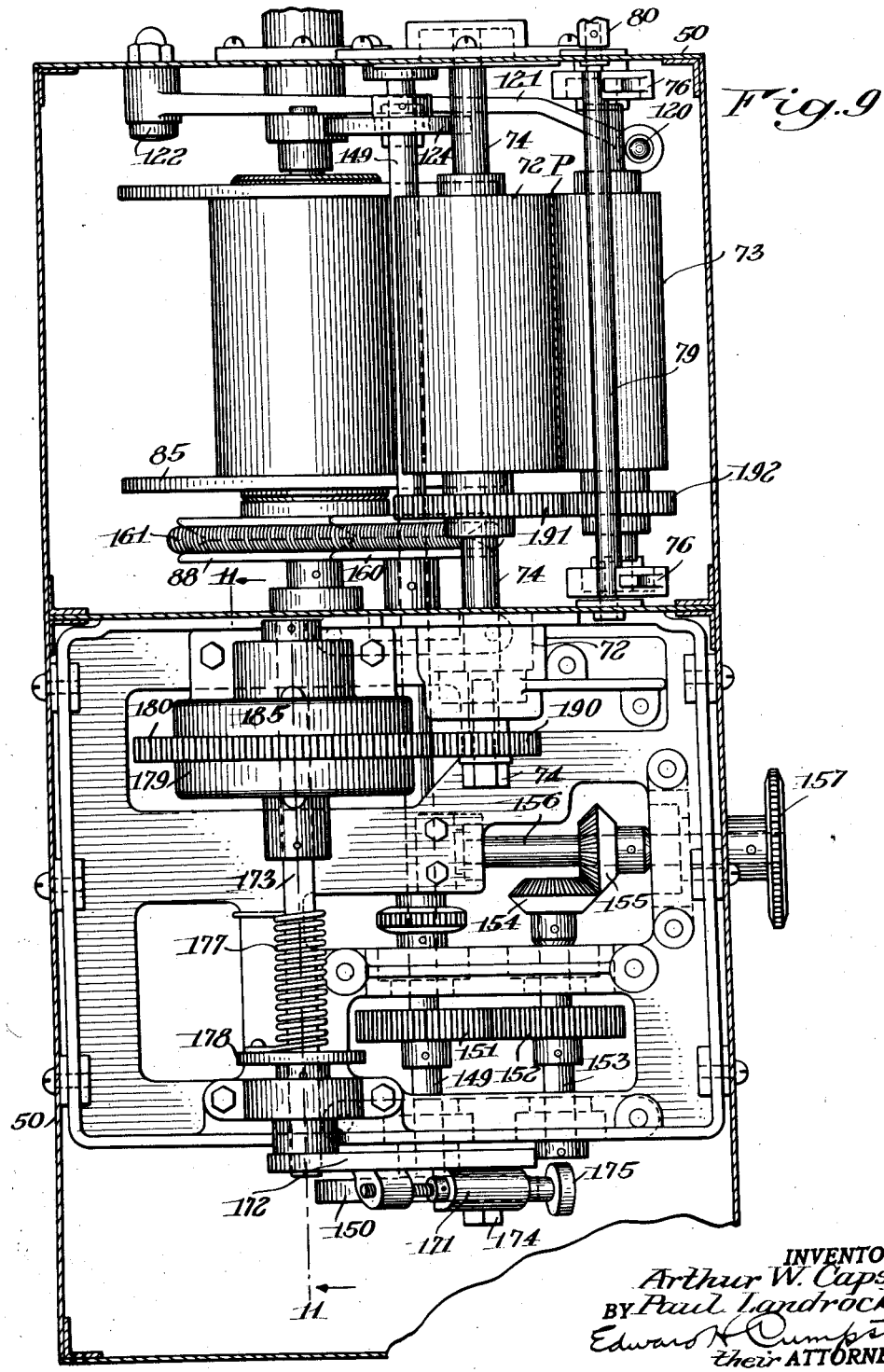

May 14, 1935. A. W. CAPS ET AL 2,001,597
CAMERA
Original Filed Dec. 21, 1931   8 Sheets-Sheet 8
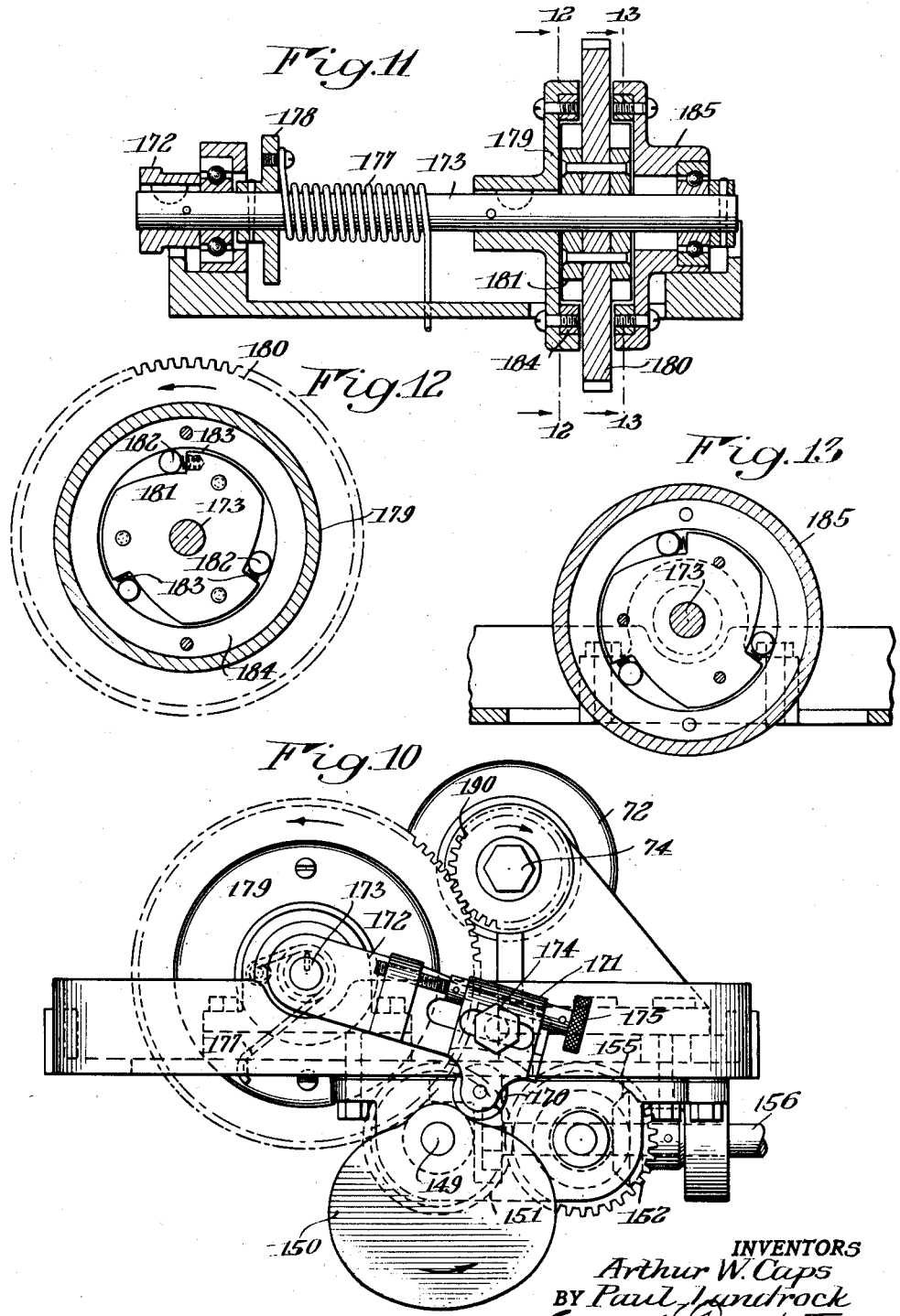
INVENTORS
Arthur W. Caps
BY Paul Lundrock
Edward Compton
their ATTORNEY Patented May 14, 1935

2,001,597

UNITED STATES PATENT OFFICE 2,001,597

CAMERA

Arthur W. Caps and Paul Landrock, Rochester, N. Y., assignors to Photostat Corporation, Providence, R. I., a corporation of Rhode Island Original application December 21, 1931, Serial No. 582,361. Divided and this application November 22, 1932, Serial No. 643,872

5 Claims. (Cl. 88—18.2)

This invention relates to a camera, and more particularly to an automatic camera so designed that it will take exposures of successive articles to be photographed, position the articles for exposure, remove them after exposure, and replace the exposed sensitized material by fresh unexposed sensitized material, all automatically and without attention of the operator otherwise than to feed the articles to be exposed to the machine.

An object of the invention is the provision of such a machine which is light, compact, simple to operate, and which is generally improved and more satisfactory than other machines heretofore known.

Another object of the invention is the provision of a machine especially designed and adapted for the rapid reproduction of relatively small forms such as cards and the like.

Still another object is the provision of simple and improved means for feeding sensitized sheet material automatically after each exposure, which means is capable of easy and precise adjustment.

A further object is the provision of improved means for holding the sensitized material in the focal plane of the camera, which means is so designed that the sensitized material may be conveniently threaded through the holding means.

A still further object of the invention is the provision of various simplified and improved details of construction, many of which are applicable to various cameras of other types.

To these and other ends the invention resides in certain improvements and combinations of parts, all as will be hereinafter more fully described, the novel features being pointed out in the claims at the end of the specification.

In the drawings:

Fig. 1 is a front elevation of a machine constructed in accordance with a preferred embodiment of the invention;

Fig. 2 is a vertical section through part of the machine, with parts in elevation, looking at the machine from the same direction as Fig. 1;

Fig. 3 is a transverse vertical section taken on a plane near the left hand end of the machine looking toward the right hand end;

Fig. 4 is a transverse vertical view somewhat similar to Fig. 3 taken on a plane farther to the right than the plane of Fig. 3, and with parts omitted;

Fig. 5 is a vertical sectional view through a part of the camera illustrating the shutter and the focal plane support;

Fig. 6 is a vertical section taken substantially on the line 6—6 of Fig. 4;

Fig. 9 is a plan of part of the driving mechanism, with the casing illustrated in horizontal section;

Fig. 10 is an end view of part of the mechanism shown in Fig. 9, viewed from the left hand end of the machine which corresponds to the bottom of the sheet containing Fig. 9;

Fig. 11 is a vertical section substantially on the line 11—11 of Fig. 9;

Fig. 12 is a vertical sectional view taken substantially on the line 12—12 of Fig. 11, showing details of a driving clutch, and Fig. 13 is a vertical sectional view taken substantially on the line 13—13 of Fig. 11, showing details of a holding clutch.

The same reference numerals throughout the several views indicate the same parts.

Figure 7:
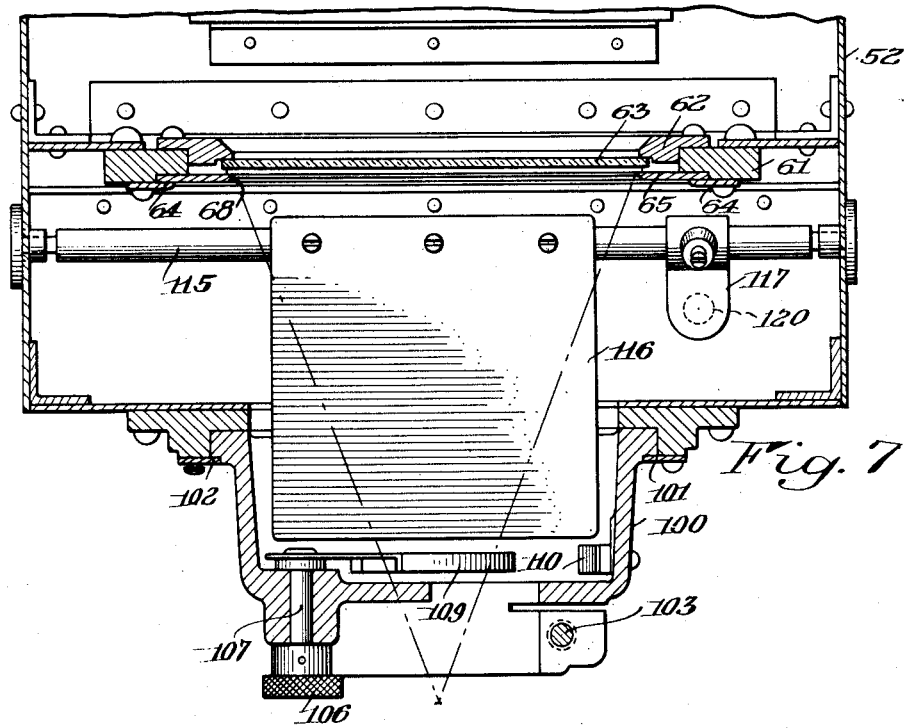
Fig. 7 is a horizontal section taken substantially on the line 7—7 of Fig. 5.

This application is a division of our copending application for patent for Camera, Serial No. 582,361, filed December 21, 1931.

Referring now to Figs. 1 to 4 inclusive, the machine comprises a main body or casing 50 having near its bottom a forward extension 51 running substantially the whole length of the casing, and an upward extension 52 near the right hand end of the main casing 50.

The focal plane support, the supply of sensitized material, the shutter, and the lens are mounted either in or upon the casing portion 52, which may be said to constitute the camera proper. The driving mechanism for the camera is located primarily within the main casing portion 50 and the forward extension 51. Above this extension 51 and mounted thereon is a casing 53 containing a copy conveyor for automatically moving the articles to be photographed into the photographic field of the camera, bringing them to rest in this field while one or more exposures are made, and then removing them from the field.

It will be most convenient to describe first the parts of the camera proper. Referring now especially to Fig. 5 of the drawings, the portion 52 of the casing is provided with a horizontal partition 55 serving as a floor for supporting a roll box 56 insertable in and removable from the casing through a rear door 57. The roll box 56 is guided laterally by suitable guide means, such as the angle irons 58, and it carries a roll 59 of sensitized photographic material such as paper, which may be led from the roll 59 over a guide roller 60 and thence downwardly over a focal plane support, the strip of sensitized material at this point being indicated by the letter P.

The focal plane support, best shown in Figs. 5 to 7 inclusive, comprises a vertical frame member 61 having a large central aperture therein, to which frame member 61 is secured a supplementary frame member 62 serving to hold a ground glass plate 63 in predetermined vertical position within the aperture of the frame 61. The sensitized material P passes downwardly over the front of the frame 61 and of the ground glass plate 63. When the sensitized material and the roll box are removed from the camera and the rear door 57 is opened, the camera may be focused by observing the image on the ground glass plate 63.

The frame 61 on its front side is provided with rabbets and with plates 64, which together form guideways in which a masking and retaining plate 65 is vertically slidable. This plate has a bent over flange 66 at its top which may be conveniently grasped when a top door 67 of the casing is opened, so that the plate 65 may be removed from its guideways by a vertical upward movement or replaced in its guideways by a vertical downward movement. When in position in its guideways, the plate 65 serves to retain the sensitized material P accurately and smoothly against the focal plane support 63, thus maintaining it accurately in the focal plane. The plate 65 is provided with an aperture 68 defining the exposure area of the sensitized material and determining the size of the exposure made thereon, the rest of the material being masked off by the plate 65 which is preferably of metal or other opaque material. Thus the plate 65 prevents stray light from affecting any part of the sensitized material, except that part which it is desired to expose.

After passing over the focal plane support the sensitized material continues downwardly through an aperture 70 in the partition 55 and through a short chute 71 and between two feeding rolls 72 and 73, the former fixed to a shaft 74 rotatable in bearings fixed in the casing, while the latter is mounted on a shaft 75, the ends of which are rotatably mounted in a pair of upstanding arms 76 pivoted at 77 at their lower ends and urged rearwardly by springs 78 so that the roller 73 normally tends to hold the sensitized material firmly against the roller 72. The upper ends of the arm 76 engage in notches in a cross shaft 79 which may be oscillated from outside the casing by a handle 80 (Fig. 2), so that the arms 76 are cammed forwardly to separate the roller 73 from roller 72 and allow sensitized material to be inserted between the rollers.

Passing on downwardly beyond the feeding rollers, the exposed sensitized material is wound up on a rewinding reel 85 mounted in the manner best shown in Fig. 2. A shaft 86 is mounted in ball bearings 87 and carries a pulley 88 having pins 89 projecting from the side thereof. These pins engage in corresponding recesses in one end of the rewinding reel 85 so that motion transmitted to the pulley 88 as hereafter described will be imparted to the reel 85 and will cause the sensitized material to be wound up on this reel. The opposite end of the rewinding reel is held on a shaft 90 inwardly urged by a spring 91 into a central aperture in the rewinding reel, but which may be pulled rightwardly to release the rewinding reel by grasping the external handle 92. When a reel 85 becomes filled with exposed sensitized material, it may be removed from the machine through a suitable door in the casing and an empty reel may be substituted for accumulating further exposed material.

The camera front, best illustrated in Figs. 2, 4, and 7, comprises a casing 100 seated in a suitable socket in the front of the camera casing 52 and held therein by a fixed overlying holding plate 101 at the right hand side and a movable overlying holding plate 102 at the left hand side. The plate 102 is held in place by screws passing through oblique slots, as best shown in Fig. 2, so that by lifting upwardly on the plate 102, it will at the same time move outwardly and release the left hand edge of the casing 101, so that this casing may be readily detached.

At the front of the casing 101 is a split ring and clamping screw 103 for detachably holding a suitable lens and prism unit 104, the prism being provided as is usual in commercial cameras for bending light rays through substantially a right angle, so that articles to be photographed may be laid in substantially horizontal position beneath the prism and the light rays passing upwardly therefrom will be bent to pass through the lens and into the camera.

On the front of the casing 100 is a knob 106 fixed to the front end of the shaft 107 which carries at its rear end an arm 108 (Figs. 7 and 8), supporting a color filter 109 which may be held in elevated ineffective position by a leaf spring 110. By oscillating the knob 106 in one direction or the other, the color filter 109 can be oscillated downwardly into an effective position in the optical axis of the camera, or moved upwardly to the position shown in Fig. 8 in which the rays of light do not pass through it.

The shutter of the camera, best shown in Figs. 4 to 7 inclusive, is of the flap type, and comprises a cross shaft 115 rotatably mounted in the casing, to which is secured the flap 116 preferably of light material, such as aluminum. The shaft 115 also carries an arm 117 which is arranged to contact with a limiting stop 118 of slightly resilient material, such as felt or rubber held in a bracket 119 secured to the wall of the casing 52, to limit the oscillation of the shaft 115 in a counter-clockwise direction when viewed as in Fig. 5. This arm 117 serves also as an operating arm, being engaged on its lower side by the operating plunger or rod 120, the lower end of which, as shown in Fig. 4, is operatively connected to the forward end of an arm 121, the rear end of which is pivoted at 122 to the side of the main casing 50. A spring 123 urges the arm 121 upwardly to lift the plunger 120 to oscillate the shaft 115 to move the shutter flap 116 to the closed position illustrated in Fig. 5. A cam 124, however, best shown in Fig. 4, and operated as hereafter described, is effective upon a follower roller 125 on the arm 121 to depress this arm and the plunger 120 and thus to allow the shutter flap 116 to drop by gravity from the closed position shown in Fig. 5 to the open position shown in Figs. 4 and 7. The arm 121 has upward extensions 126 at each side of the follower roller 125 which lie on each side of the cam 124 and thus limit lateral play of the arm 121.

Figure 8:
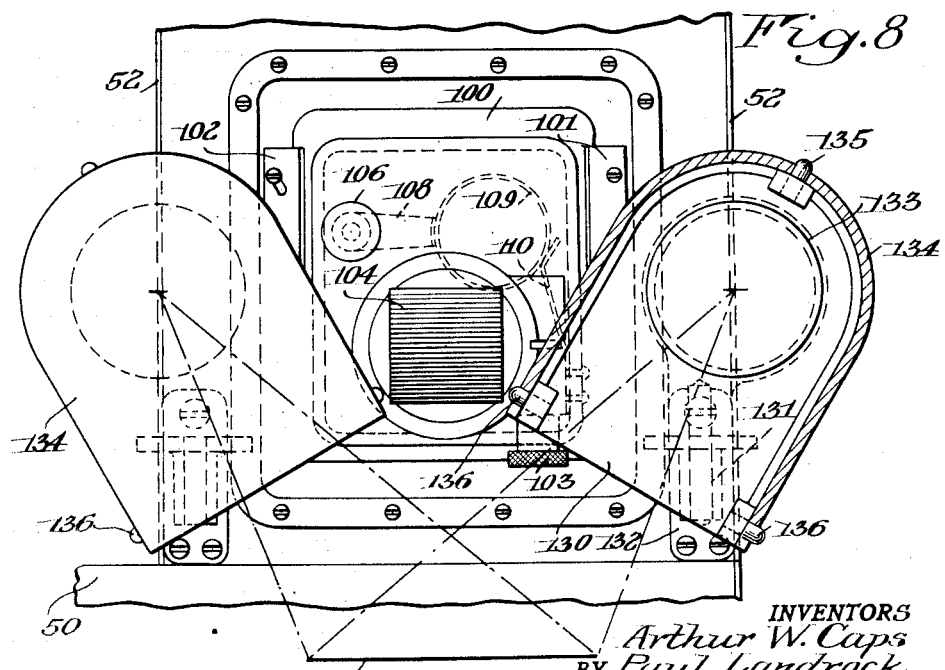
Fig. 8 is a fragmentary front elevation of part of the camera with one of the lamp housings shown in vertical section.

For illuminating the articles to be copied suitable illuminating means is provided, as best shown in Figs. 1 and 8. At the front of the machine are a pair of brackets 130 each in the form of a substantially vertical plate having a rounded top and each having secured thereto a pin 131 adapted to fit loosely into a receiving socket 132 on the front of the camera casing 52. Each of these brackets 130 carries a socket for receiving an electric light bulb 133. Over each bulb is placed a quickly removable protecting and reflecting casing 134 enveloping the bulb 133 at the top and front, but being open at the bottom so that light may issue through the bottom opening. Each bracket 130 is provided with an upper pin 135 passing through a hole near the top of the casing 134, and with a pair of lower pins 136 received in slots at the bottom of casing 134, so that merely by lifting the casing upwardly it may be disengaged and removed from the bracket 130 to permit access to the bulb 133 for replacement thereof. Similarly, after the bulb has been replaced, the casing 134 may be readily attached again simply by lowering it so that the pins 135 and 136 may be received in their respective hole and slots. The axis of each reflecting and protecting casing 134 is slightly inclined as illustrated in the drawings so that the light furnished by the illuminating units will be directed upon the article to be photographed, diagrammatically illustrated at 137 in Fig. 8.

The driving mechanism for the parts so far described will now be explained, first referring to Figs. 2 and 3. A suitable source of power, preferably an electric motor 140, is mounted near the front end of a bed plate 141, which is preferably of somewhat triangular shape in plan, having a three point support so that it may be readily adjusted and alined. The front or wide end of the bed plate 141 is supported on two balls 142 and held down in contact with them by bolts 143, while the rear or narrow end of the bed plate is supported by the stud 144 and may be adjusted upwardly or downwardly by shifting the nuts 145 and 146.

On this bed plate near the rear end thereof is mounted a worm reduction gear unit 147 driven directly from the motor 140, as shown in Fig. 3, while this reduction gear 147 drives through a chain 148 or other suitable drive, a shaft 149.

At its left hand end this shaft 149 carries a feeding cam 150, the operation of which will be hereafter described. The shaft also carries a spur gear 151, best seen in Fig. 9, meshing with another spur gear 152 on a shaft 153 carrying a bevel gear 154 driving another bevel gear 155 on a shaft 156 at right angles to the shafts 149 and 153. The shaft 156 thus driven from the shaft 149 carries a sprocket 157 over which runs a chain 158, Fig. 1, for driving the conveying mechanism which will be hereafter described.

The shaft 149 also carries a pulley 160 (Figs. 2 and 9) in substantially the same plane as the pulley 88 of the rewinding reel 85. A suitable friction drive, such as the coiled spring belt 161, passes over the pulleys 160 and 88, so that rotation of the pulley 160 tends to be transmitted to the rewinding pulley 88, but the coiled spring 161 may easily slip over the pulleys whenever the sensitized material is stationary and impedes the rotation of the rewinding reel 85.

The feeding of the sensitized material after each exposure is controlled by the cam 150 above mentioned. Referring now to Figs. 3 and 10, it will be seen that this cam 150 acts upon a follower roll 170 mounted on a block 171 adjustable radially along an arm 172 fixed to a shaft 173. A lag screw 174 threaded into the arm 172 passes through a slot in the block 171 so that when the screw is loosened the block may be adjusted radially along the arm 172 toward and away from the shaft 173 and when the screw 174 is tightened the block 171 will be held in adjusted position. An adjusting screw 175 is provided for accurately adjusting the block 171 along the arm.

By this arrangement, the effective distance of the follower roller 170 from the axis of the shaft 173 can be adjusted through a limited range and thus the extent of oscillation of the shaft 173 at each actuation by the cam 150 can be varied slightly, in order to adjust accurately the amount of feeding imparted to the sensitized material at each cycle of operation.

As best shown in Figs. 9 and 11, the shaft 173 is provided with a spring 177 coiled around the shaft, one end of the spring being fixed to a collar 178 on the shaft and the other end of the spring engaging a stationary part of the framework, so that the spring tends to rotate the shaft in a clockwise direction when viewed as in Figs. 3 and 10, and thus holds the follower roller 170 downwardly in engagement with the cam 150, but nevertheless permits the shaft 173 to be oscillated in a counter-clockwise direction by the action of the cam upon the follower roller. This counter-clockwise oscillation is transmitted through a one-way driving clutch 179 (Figs. 11 and 12) to the gear 180 rotatably mounted on the shaft 173. The clutch is of any suitable one-way driving construction, comprising, for example, a hub member 181 fixed to the gear 180 which is to be driven, and having a plurality of rollers 182 mounted in tapered notches and pressed by springs 183 so as to engage the internal face of a ring 184 fixed in the housing of the clutch 179. Thus any counter-clockwise rotation of the ring 184 which is fixed to rotate with the shaft 173 is transmitted to the hub 181 and causes corresponding counter-clockwise rotation of the gear 180, but when the shaft 173 returns in a clockwise direction under the influence of the spring 177, then the rollers 182 will simply move slightly against the action of their springs 183 so that the clutch slips without causing corresponding movement of the gear 180.

To prevent any accidental retrograde movement of the gear 180 it is provided with a second clutch 185 similar in construction to the clutch 179, but the casing of which is non-rotatably secured to the frame work of the mechanism. By means of similar spring pressed rollers in known manner the clutch 185 will permit the gear 180 to move in a counter-clockwise direction under the influence of the shaft 173, but will positively hold it against accidental reverse movement.

Through the mechanism above described, each rotation of the shaft 149 and its feeding cam 150 results in a single oscillation of the shaft 173, first in a counterclockwise direction as the follower roller 170 moves up from the low point to the high point of the cam, and then in a clockwise direction as the follower roller moves down from the high point to the low point. This oscillation of the shaft 173 is thus translated into an intermittent unidirectional movement of the gear 180, which moves in a counter-clockwise direction when the shaft is moving in that direction, and which remains stationary when the shaft moves in a reverse direction.

The gear 180, as best shown in Figs. 3 and 9, meshes with a gear 190 on the shaft 74 which carries the feeding roller 72. The shaft 74 in turn carries a spur gear 191 (Fig. 9) meshing with a spur gear 192 on the shaft 75 of the other feeding roller 73. The gears 191 and 192 are of the same proportion relative to each other as the diameters of the feeding rollers 72 and 73, so that these two rollers will always rotate in synchronism. The gears 180 and 190 are so proportioned relative to each other that each intermittent movement of the gear 180 will be sufficient to rotate the gear 190 enough to move the feed rollers to a sufficient extent so that the exposed portion of sensitized material is completely moved out of the exposure area and a fresh unexposed portion is drawn into the exposure area of the focal plane. As before stated, the extent of feeding can be minutely adjusted by moving the block 171 on which the follower roller 170 is mounted.

The cam 124 for operating the shutter of the camera is likewise mounted on the shaft 149 above mentioned, on which the feeding cam 150 is mounted. These two cams are so placed relative to each other on the shaft 149, that the feeding of the sensitized material will take place only when the shutter is closed, and the shutter will open only when the feed rollers are at rest so that a fresh supply of sensitized material is held stationary in the focal plane.

As previously stated, the present machine is provided with conveyor means within the casing 53 for automatically positioning articles to be photographed in proper position in the photographic field of the camera. This conveyor means is fully disclosed in the above mentioned co-pending application Serial No. 582,361, of which this case is a division. Some of the features of the conveyor means may be briefly described in the present application, however, with reference to Figs. 1 and 3.

Near each end of the conveyor casing 53 is a cross shaft, the one near the left hand end being designated by the numeral 200 and the one near the right hand end being shown at 201. Each shaft carries a pair of sprockets 202, all of which may be identical in construction. Over these sprockets runs a pair of conveyor chains having slats extending transversely from one chain to the other to provide a bed on which the copy to be reproduced is placed. This copy may consist, for example, of index cards or any other desired articles or documents.

The conveyor is driven by any suitable means, preferably from the chain 158, which is driven from the sprocket 157. This chain 158, as shown in Fig. 1, drives a sprocket 238 on a shaft in a leftward extension 247 of the conveyor housing 53, which extension contains a suitable form of mechanism for driving the conveyor rightwardly through intermittent step by step movements to carry successive pieces of copy into the photographic field of the camera, all as described in the aforesaid co-pending application. The details of the conveyor means and of the driving mechanism forming part of these means, do not form any part of the present invention, and are not claimed in this application.

The driving mechanism within the casing 247 is preferably so designed that, if desired, several exposures of each piece of copy can be made instead of only one. The casing is accordingly provided with a control knob 257 cooperating with an index 258, and by suitable manipulation of this knob each article on the conveyor will be held in the photographic field of the camera during one, two, three, or four exposure operations of the camera as may be desired.

After the exposure or exposures of each piece of copy have been made, further rightward movement of the conveyor eventually discharges the piece of copy from the conveyor into a receiver 302 into which it is guided by a part 340, both mounted by means of a bracket 350 on the right hand end of the conveyor housing 53.

The conveyor housing 53 together with the extension 247 and the copy receiver 302 are adjustably mounted as a unit relative to the main casing parts 50 and 51 for focusing the camera. Preferably the conveyor casing 53 is carried by vertical brackets 355 (Fig. 1) secured to the ends of the casing 51 by bolts 356 passing through slots in the brackets so that when the bolts are loosened the brackets may be adjusted upwardly or downwardly by adjusting screws 357. The brackets 355, in turn, are secured to the conveyor casing 53 by lag screws 360 which pass through relatively large holes in the brackets and screw into the bottom of the conveyor casing. When these screws 360 are loosened, the conveyor casing may be adjusted through a limited extent both forwardly or backwardly or sideways, as may be desired. Adjusting screws 361 are provided for assisting the forward and backward adjustment of the conveyor.

In focusing the camera either initially at the factory or when setting up the mechanism at a place where it is to be used, the roll box 56 is removed through the rear door 57, as previously explained, so that the operator may see the image upon the ground glass plate 63. By means of the adjustments described immediately above, the conveyor and its driving mechanism and stacking mechanism can all be adjusted together as a unit, vertical adjustment being made, if necessary, to bring the articles on the conveyor accurately into proper focus, while horizontal adjustment may be made so that when the conveyor is in its position of rest, an article held by the holding means on the conveyor will be accurately centered in the photographic field of the camera, all as may be ascertained by noting the image on the ground glass plate.

In operation, after the camera has been properly focused, the roll box 56 containing a roll 59 of sensitized material, is placed in the camera through the door 57, which may then be closed. The top door 67 is then opened, and the strip P of sensitized material is led from the roll 59 forwardly, over the guide roll 60, and shoved downwardly through the space between the focal plane support 63 (the glass plate) and the retaining plate 65. If desired, the retaining plate 65 may be removed, the sheet material may be laid against the front of the glass plate, and the plate 65 may then be replaced by sliding it downwardly in its guiding grooves.

The release lever 80 for the feed rollers is then oscillated to separate the rollers 72 and 73 slightly from each other, after which the strip of sensitized material is shoved on downwardly between these rollers and pulled downwardly and connected to the rewinding reel 85 in a manner familiar to those skilled in the art. The handle 80 is then returned to its normal position, permitting the roller 73 to be pulled toward the roller 72 by the action of the spring 78 so that the feeding rollers effectively grip the sensitized material and will be operative to feed it upon rotation of the rollers. The various doors of the camera casing are then closed.

The camera is now ready for the actual taking of exposures. The motor and the illuminating lamps are turned on, and the operator, standing in front of and facing the machine, a little to the left of the camera lens, deposits the cards or other articles to be photographed on the conveyor, one at a time, placing them accurately between certain holding lugs or guides provided on the conveyor so that they are positioned in predetermined relation to the conveyor.

It will be recalled that the conveyor is driven intermittently. During one of its periods of rest one of the articles will be properly positioned immediately below the camera prism in the photographic field of the camera. At this time the cam 124 (Fig. 4) on the shaft 149 rotates to such a position that the follower roller 125 is forced downwardly, depressing the lever 121 and the plunger 120, and permitting the shutter 116 to drop by gravity to the open position shown in Fig. 4. Continued rotation of the shaft 149 brings the low point of the cam 124 over the follower roller 125, so that the spring 123 moves the lever 121 and the plunger 120 upwardly, thus shifting the shutter 116 from its open position to the closed position shown in Fig. 5, which completely obstructs the light which would otherwise pass through the aperture 68 in the masking plate 65 and reach the sensitized material.

After the shutter is completely closed the rotation of the cam 150 (Figs. 3 and 10) is effective to lift up the follower roller 170 and cause a counter-clockwise oscillation of the feeding lever 172, which produces a corresponding counter-clockwise movement of the shaft 173. Through the one way clutch 179 this movement is tranmitted to the gear 180, while through the gear 190 meshing therewith it causes a rotation of the feeding rollers 72 and 73, which is effective to feed the sensitized sheet material so as to remove the exposed portion from the exposure area of the focal plane, and draw a fresh unexposed portion of the material into the exposure area ready for the next exposure.

While this feeding of the sensitized material is taking place, and assuming that the mechanism is set for taking only one exposure of each article, the conveyor is driven one step forwardly to bring a fresh piece of copy into the photographic field of the camera. At or after the completion of the conveyor movement and the feeding of the sensitized material, the cam 124 once more opens the shutter so that another exposure is made. Then when the shutter closes, the sensitized material is once more fed downwardly and the exposed portion is gradually accumulated on the rewinding reel 85. Likewise the conveyor once more moves forwardly to carry the photographed article out of the field of the camera and to bring another article into the field.

If it is desired to take more than one exposure of each article, the camera parts operate as before, but by shifting the control knob 251 the conveyor driving mechanism can be made to drive the conveyor forwardly only once for each two, three, or four exposures, so that the same piece of copy remains in the photographic field of the camera for the desired number of exposures.

After the articles have been photographed, continued rightward movement of the conveyor discharges them into the receiver 302 where they are stacked for convenient removal.

When the supply of sensitized material on the roll 59 is exhausted, a fresh roll is placed in the roll box 56 and the sensitized material is once more threaded across the focal plane support, between the feeding rollers, and to a fresh rewinding reel 85. The full rewinding reel on which the exposed sensitized material has accumulated is removed from the apparatus by pulling outwardly on the handle 92 (Fig. 2) to release the reel from its supporting bearings, after which the exposed material may be developed or otherwise treated in any desired or suitable manner.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

We claim:

1. Photographic apparatus comprising a camera, roller means for feeding sensitized material in said camera, an arm mounted for oscillation and operatively connected to said roller means, cam means for oscillating said arm to operate said roller means, and means for varying the effective length of said arm to vary the amount of sensitized material fed by said roller means at each oscillation caused by said cam means.

2. Photographic apparatus comprising a camera, roller means for feeding sensitized material in said camera, an arm mounted for oscillation and operatively connected to said roller means, a cam, a follower roller on said arm for contacting with said cam so that said cam may oscillate said arm to operate said feeding means, and means for adjusting said follower roller on said arm to vary the amount of feeding of said sensitized material at each operation of said cam.

3. Photographic apparatus comprising a camera, a feed roller for feeding sensitized material within said camera, an oscillating lever for operating said feed roller, a one-way clutch interposed between said lever and said roller so that oscillations of said lever in only one direction will be imparted to said roller, and a second one-way clutch operatively connected to said roller to prevent retrograde movement thereof during oscillation of said lever in the opposite direction.

4. An automatic camera having a pivoted flap shutter, means for holding a supply of sensitized material, and mechanism for feeding said sensitized material, characterized by a constantly rotating shaft, an operating member for pressing loosely against said shutter to close it, a pivoted lever for moving said operating member, cam means on said shaft for moving said lever to open and close said shutter at regular intervals, and cam means on sad shaft for operating said feeding mechanism when said shutter is closed.

5. An automatic camera having means for holding a supply of sensitized material, mechanism for feeding said sensitized material, and a shutter normally tending to assume an open position, characterized by a pivoted lever, a follower roller on said lever, a plunger movable by said lever to press against said shutter to close it, resilient means acting on said lever for holding said shutter closed, cam means contacting with said follower roller for displacing said pivoted lever against the action of said resilient means to permit the shutter to open at regular intervals, and means for operating said feeding mechanism when said shutter is closed.

ARTHUR W. CAPS.
PAUL LANDROCK.